(12) United States Patent
Valles et al.

(10) Patent No.: US 11,453,359 B2
(45) Date of Patent: Sep. 27, 2022

(54) AIRBAG WITH CONICAL PORTION

(71) Applicant: ZF PASSIVE SAFETY SYSTEMS US INC., Washington, MI (US)

(72) Inventors: Jorge Valles, Chihuahua (MX); Rigo Solis, Chihuahua (MX); Oscar Garcia, Chihuahua (MX)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 16/500,452

(22) PCT Filed: May 2, 2018

(86) PCT No.: PCT/US2018/030550
§ 371 (c)(1),
(2) Date: Oct. 3, 2019

(87) PCT Pub. No.: WO2018/204429
PCT Pub. Date: Nov. 8, 2018

(65) Prior Publication Data
US 2020/0055482 A1 Feb. 20, 2020

Related U.S. Application Data

(60) Provisional application No. 62/501,147, filed on May 4, 2017.

(51) Int. Cl.
*B60R 21/231* (2011.01)
*B60R 21/203* (2006.01)
(Continued)

(52) U.S. Cl.
CPC ........ *B60R 21/231* (2013.01); *B60R 21/2035* (2013.01); *B60R 21/235* (2013.01);
(Continued)

(58) Field of Classification Search
CPC . B60R 21/231; B60R 21/2035; B60R 21/235; B60R 21/272; B60R 2021/23509;
(Continued)

(56) References Cited

U.S. PATENT DOCUMENTS 3,618,979 A * 11/1971 Gulette ................. B60R 21/231
280/731
5,536,038 A 7/1996 Bollaert et al.
(Continued)

*Primary Examiner* — Paul N Dickson
*Assistant Examiner* — Caitlin Anne Miller
(74) *Attorney, Agent, or Firm* — Tarolli, Sundheim, Covell & Tummino LLP

(57) ABSTRACT

An inflatable vehicle occupant protection device (14b) includes a front panel (102b) and a rear panel (122b) that are interconnected to at least partially define an inflatable volume (54b) of the protection device. The rear panel (122b) has a conical configuration resulting from portions of the rear panel being interconnected with each other. The rear panel (122b) comprises portions interconnected along a seam (214), the seam being configured to deviate laterally from a deployment direction so that portions of the air bag that engage and move along the seam shift laterally during deployment to reduce damage due to friction with the seam.

16 Claims, 11 Drawing Sheets

(51) Int. Cl.
*B60R 21/235* (2006.01)
*B60R 21/272* (2006.01)

(52) U.S. Cl.
CPC .. *B60R 21/272* (2013.01); *B60R 2021/23509* (2013.01); *B60R 2021/23538* (2013.01); *B60R 2021/23576* (2013.01)

(58) Field of Classification Search
CPC ........... B60R 2021/23538; B60R 2021/23576; B60R 21/2334
See application file for complete search history.

(56) References Cited

U.S. PATENT DOCUMENTS

| | | | |
|---|---|---|---|
| 6,837,517 B2 * | 1/2005 | Keshavaraj | B60R 21/231 280/743.1 |
| 8,282,122 B2 * | 10/2012 | Marable | B60R 21/233 280/729 |
| 8,608,199 B2 * | 12/2013 | Fischer | B60R 21/231 280/743.1 |
| 9,399,440 B2 * | 7/2016 | Fujiwara | B60R 21/235 |
| 9,688,229 B2 * | 6/2017 | Sekino | B60R 21/235 |
| 9,834,168 B2 * | 12/2017 | Deng | B60R 21/207 |
| 2006/0049618 A1 * | 3/2006 | Bito | B60R 21/2346 280/732 |
| 2007/0046008 A1 * | 3/2007 | Keutz | B60R 21/231 280/743.1 |
| 2007/0052221 A1 * | 3/2007 | Okada | B60R 21/261 280/735 |
| 2012/0205899 A1 * | 8/2012 | Guide | B60R 21/235 280/732 |
| 2013/0285356 A1 * | 10/2013 | Fischer | B60R 21/203 280/731 |
| 2017/0072898 A1 | 3/2017 | Deng et al. | |

\* cited by examiner

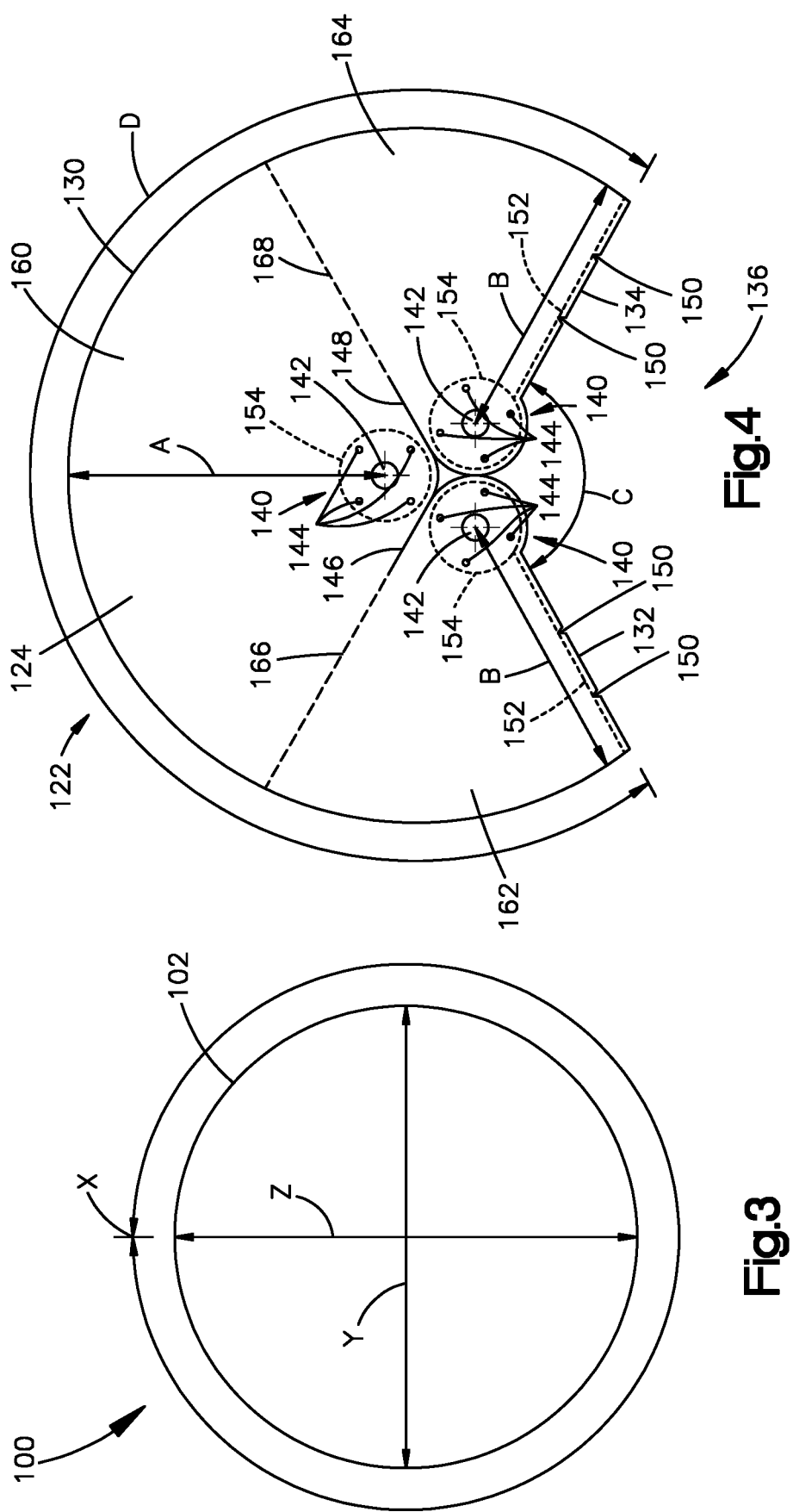

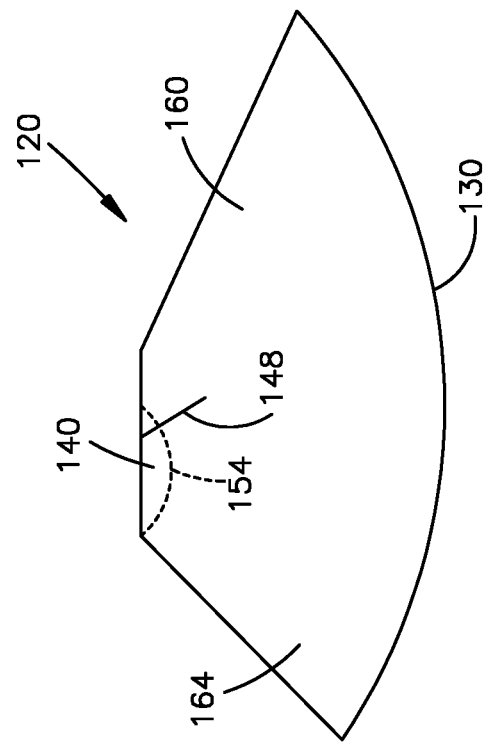
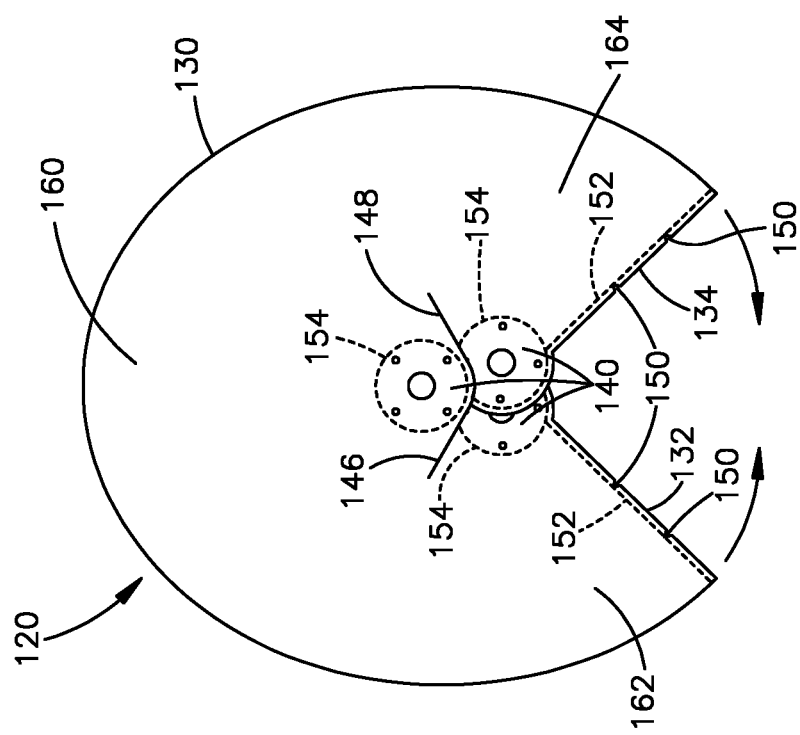

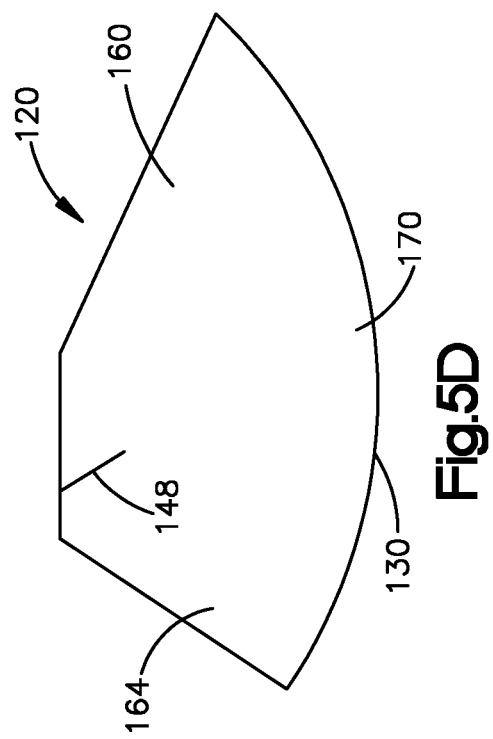
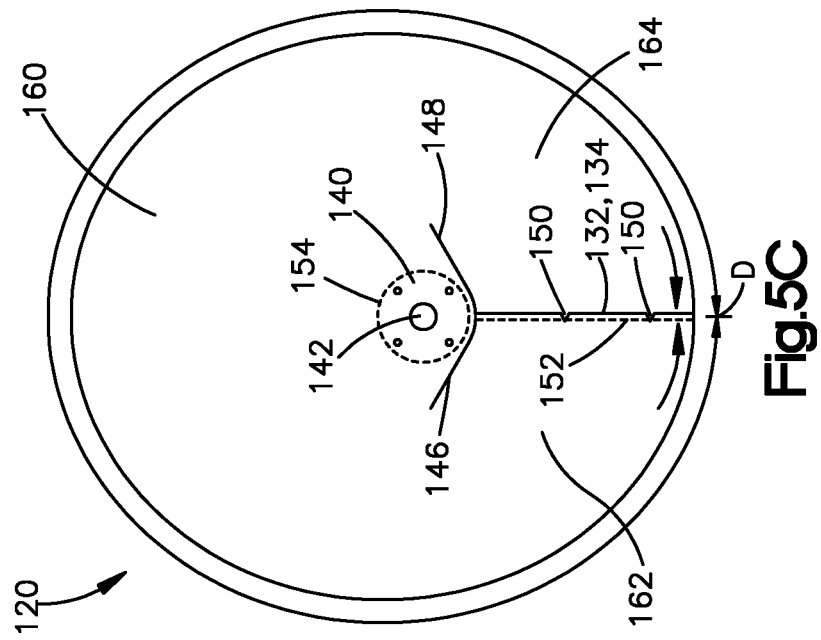

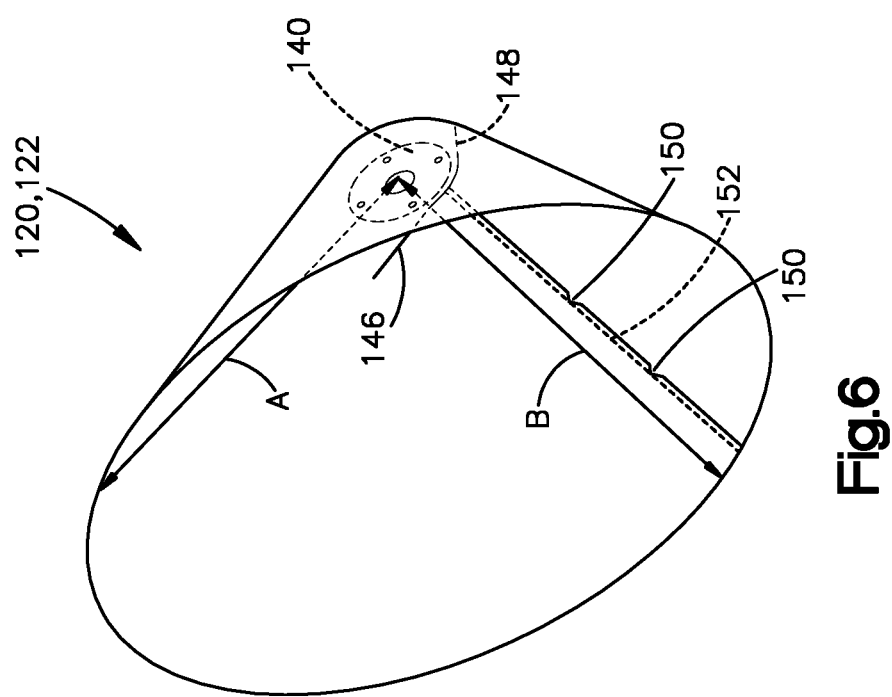

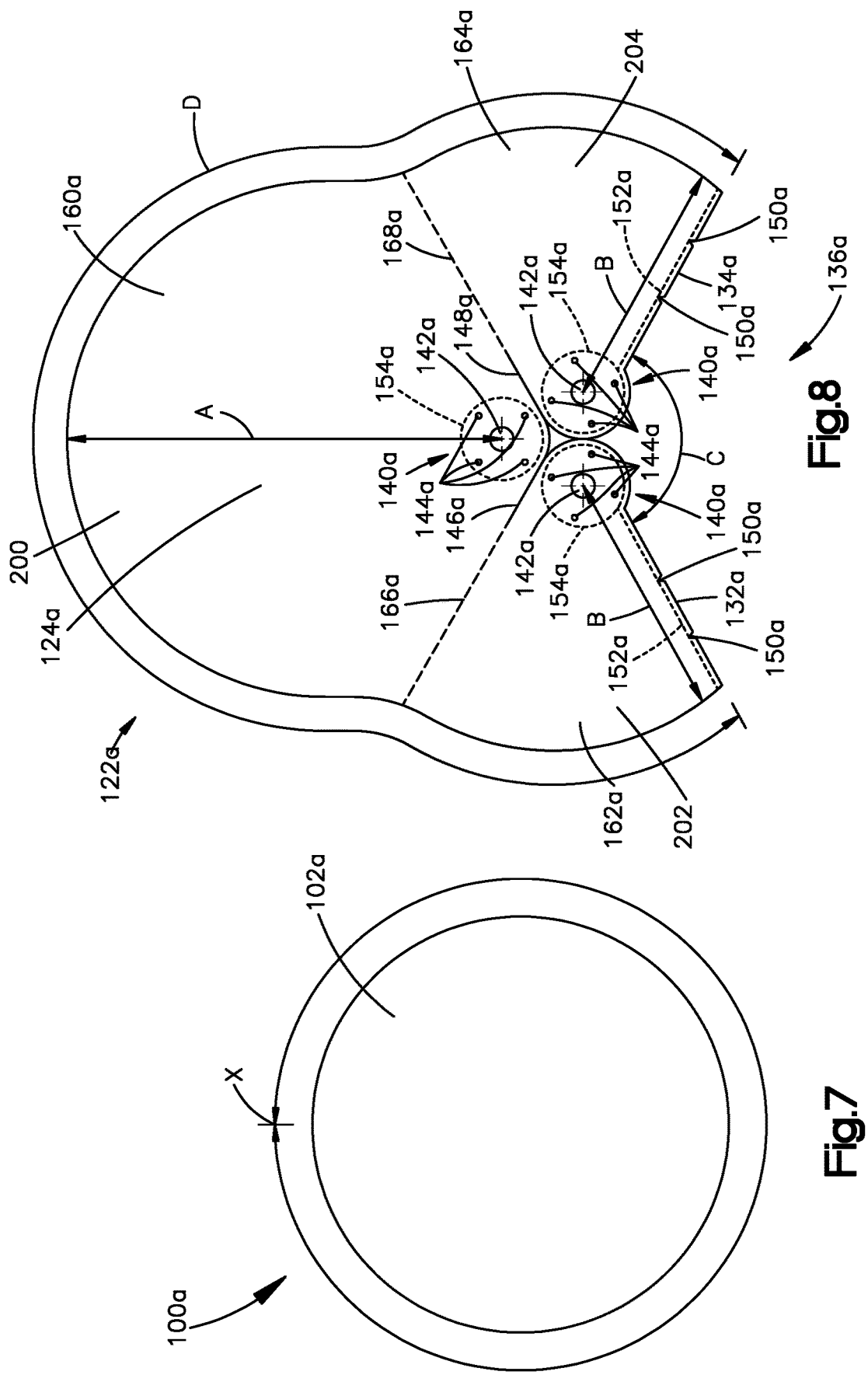

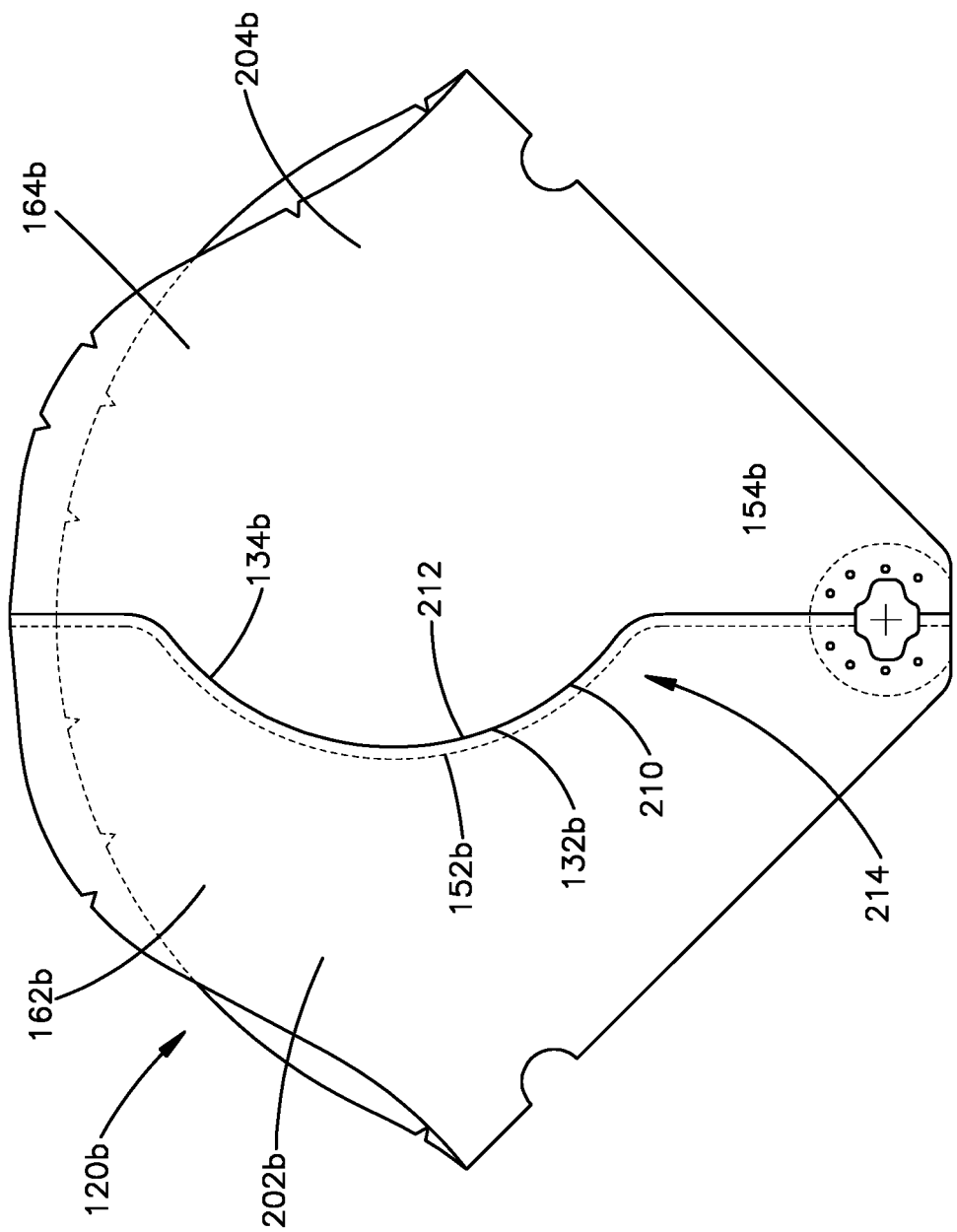

AIRBAG WITH CONICAL PORTION

FIELD OF THE INVENTION

The invention relates to an apparatus for helping to protect an occupant of a vehicle. More particularly, the invention relates to an airbag inflatable between a portion of a vehicle and a vehicle occupant. In one embodiment, the invention relates to an airbag inflatable between an instrument panel and a front seat vehicle occupant.

BACKGROUND OF THE INVENTION

It is known to provide an inflatable vehicle occupant protection device, such as an airbag, for helping to protect an occupant of a vehicle. Airbags are inflatable between a portion of the vehicle and a vehicle occupant. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag cover is connectable with the housing and/or instrument panel to help enclose and conceal the airbag in a stored condition. Upon deployment of the passenger airbag, the airbag cover opens to permit the airbag to move to an inflated position. The airbag cover opens as a result of forces exerted on the cover by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated position. The airbag cover opens as a result of forces exerted on the cover by the inflating driver airbag.

Driver and passenger airbags are configured to have desired areas of coverage and also to have a desired degree of depth. Typically, an airbag is configured to have a desired inflated depth through the use of structures, such as internal tethers, that interconnect opposing panels (e.g., front and rear panels) of the airbag. The tethers limit the degree to which the opposing panels can move away from each other when the airbag is inflated. The tethers also can add to the complexity of the airbag construction.

SUMMARY OF THE INVENTION

The invention relates to an inflatable vehicle occupant protection device in the form of an airbag that includes a front panel and a rear panel that are interconnected to at least partially define an inflatable volume of the protection device. The rear panel has a conical configuration resulting from portions of the rear panel being interconnected with each other. The interconnected portions are configured to have a curved seam that reduces friction with a front panel during deployment by causing the portion of the front panel that engages the seam to shift laterally during deployment.

The curved seam configuration deviates from what would be considered the conventional wisdom in airbag design. Typically, economies of scale would dictate that the construction that is the simplest and least expensive, even if only marginally, is preferable, given that airbags are constructed on the order of millions of units. For the present invention, one or more seams of the protection device are configured to deviate from the most efficient, economical configuration, in order to avoid the occurrence of small, focused portions of the airbag frictionally engaging the seam along its entire length, or a substantial portion thereof, during deployment. Accordingly, a seam that would normally have a straight configuration in order to reduce material costs, manufacturing time, and complexity, is configured to have a curved configuration in order to avoid the aforementioned prolonged contact that would result from a linear seam.

According to one aspect, an inflatable vehicle occupant protection device includes a front panel and a rear panel that are interconnected to at least partially define an inflatable volume of the protection device. The rear panel has a conical configuration resulting from portions of the rear panel being interconnected with each other. The rear panel includes portions interconnected along a seam that is configured to deviate laterally from a deployment direction so that portions of the air bag that engage and move along the seam shift laterally during deployment. This helps reduce damage due to friction with the seam.

According to another aspect, alone or in combination with any other aspect, the rear panel can have a cutout portion that defines first and second radially extending edge portions of the rear panel. The interconnected portions of the rear panel can include the first and second edge portions. The first and second edge portions can be curved so that the seam takes on a curved configuration.

According to another aspect, alone or in combination with any other aspect, the curve of the first and second edges can be mirror images of each other.

According to another aspect, alone or in combination with any other aspect, the curve of the first edge can be concave and the curve of the second edge can be convex.

According to another aspect, alone or in combination with any other aspect, the rear panel can have a first dimension associated with a length of a portion of the rear panel extending along a line that bisects an angle between the first and second edge portions. The first dimension helps determine the inflated reach and depth of an upper portion of the protection device.

According to another aspect, alone or in combination with any other aspect, the rear panel can have a second dimension associated with the length of the first and second edge portions. The second dimension helps determine the inflated reach and depth of a lower portion of the protection device.

According to another aspect, alone or in combination with any other aspect, the rear panel can have a third dimension associated with the angle between the first and second edge portions. The third dimension helps determine the inflated depth of both the upper and lower portions of the protection device.

According to another aspect, alone or in combination with any other aspect, the rear panel can have a peripheral edge portion that extends from a radial end of the first edge portion to a radial end of the second edge portion. The front panel can have a peripheral edge portion that extends around an entire peripheral edge portion of the front panel. The peripheral edge portion of the rear panel can have a length that is substantially equal to a length of the peripheral edge portion of the front panel.

According to another aspect, alone or in combination with any other aspect, the rear panel can include a first inflator receiving portion, a second inflator receiving portion, and a third inflator receiving portion positioned between the first and second inflator receiving portions. A first slit in the rear panel can be located between the first and third inflator receiving portions. A second slit in the rear panel can be located between second and third inflator receiving portions. The first and second slits can permit the first and second inflator receiving portions to move into overlying alignment with each other and with the third inflator receiving portion when the portions of the rear panel are interconnected.

According to another aspect, alone or in combination with any other aspect, the rear panel can include a first inflator receiving portion at an end of the first edge portion, a second inflator receiving portion at the end of the second edge portion, and a third inflator receiving portion positioned between the first and second inflator receiving portions. The first and second inflator receiving portions can move into overlying alignment with each other and with the third inflator receiving portion when the portions of the rear panel are interconnected.

According to another aspect, alone or in combination with any other aspect, a first slit in rear panel can be located between first and third inflator receiving portions, and a second slit in rear panel can be located between second and third inflator receiving portions. The first and second slits can permit the first and second inflator receiving portions to move into alignment with each other and with third inflator receiving portion when the portions of the rear panel are interconnected.

According to another aspect, alone or in combination with any other aspect, the protection device can be a driver frontal airbag. The rear panel can connect the protection device to a vehicle steering wheel.

According to another aspect, alone or in combination with any other aspect, the front panel can have a single piece fabric construction and the rear panel can have a single piece fabric construction. The inflatable volume of the protection device can be defined entirely by these two single pieces of fabric.

According to another aspect, alone or in combination with any other aspect, an airbag module can include the protection device, an inflator for providing inflation fluid for inflating the protection device, and a housing for storing the protection device in an deflated condition.

According to another aspect, alone or in combination with any other aspect, a vehicle safety system can include an airbag module, which can include the protection device, an inflator for providing inflation fluid for inflating the protection device, and a housing for storing the protection device in an deflated condition.

According to another aspect, alone or in combination with any other aspect, a method for constructing an inflatable vehicle occupant protection device can include providing a panel of material for constructing the protection device. The method can also include forming a cutout portion in the panel defining first and second edge portions that extend inward from a periphery of the panel toward each other in a converging manner. The method can also include folding or otherwise manipulating the panel to position the first and second edge portions overlapping each other. The method can further include interconnecting the overlying first and second edge portions to define a seam of the airbag. The step of forming a cutout portion can include configuring the cutout portion so that the first and second edge portions have curved configurations resulting in a curved configuration of the seam that deviates from a more efficient linear seam configuration.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIGS. 3 and 4 are plan views of portions of the apparatus of FIG. 1;

FIGS. 5A-5D are schematic views illustrating the construction of a portion of the apparatus of FIG. 1;

FIG. 6 is a perspective view of a constructed portion of the apparatus of FIGS. 5A-5D;

FIGS. 7 and 8 are plan views of portions of an apparatus for helping to protect an occupant of a vehicle, according to another embodiment of the invention;

FIG. 12 is a plan view of the apparatus of FIGS. 10 and 11 in a partially assembled condition.

DETAILED DESCRIPTION OF THE INVENTION

Figure 1:
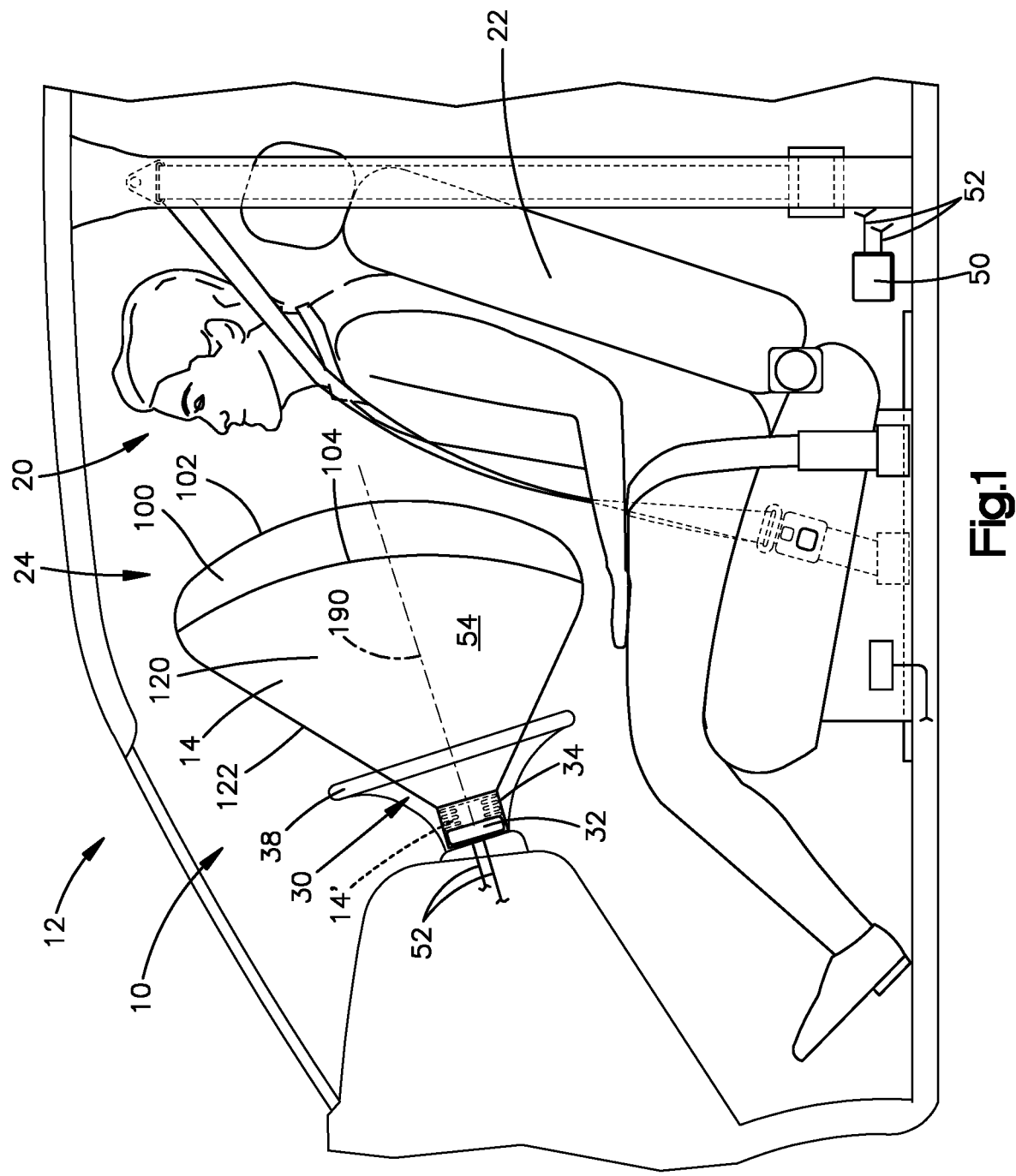
FIG. 1 is a schematic side view illustrating an apparatus for helping to protect an occupant of a vehicle, according to an embodiment of the invention.

An apparatus 10 for helping to protect an occupant 20 of a vehicle 12 includes an inflatable vehicle occupant protection device 14 in the form of an airbag. In the embodiment illustrated in FIG. 1, the airbag 14 is a driver frontal airbag for helping to protect an occupant 20 of a seat 22 on a driver side 24 of the vehicle 12. Those skilled in the art will appreciate that the apparatus 10 disclosed herein could be adapted for a passenger side vehicle occupant (not shown) or occupants of rearward rows of the vehicle 12, such as a $2^{nd}$ row, $3^{rd}$ row, etc., of the vehicle (not shown).

The airbag 14 may be part of an airbag module 30 that includes an inflator 32 and a housing 34. The airbag 14 has a stored condition, indicated by dashed lines in FIG. 1, in which the airbag is folded and placed in the housing 34. The module 30 is mounted to a steering wheel 38 extending from an instrument panel 36 of the vehicle 12.

An airbag cover (not shown) is releasably connected to the steering wheel 38 and/or the housing 34. In a closed condition (not shown), the airbag cover helps enclose the airbag 14 in the stored condition in the housing 34. The cover is movable to an opened condition to uncover an opening through which the airbag 14 may be deployed from the stored condition in the housing 34. The cover may be connected to the vehicle 12, e.g., the steering wheel 38, either directly or through the housing 34, by means (not shown), such as a plastic hinge portion, a strap, or a tether. In one embodiment, the cover may be rupturable and may tear opened when the airbag 14 is inflated and deployed.

The inflator 32 is actuatable to provide inflation fluid to an inflatable volume 54 of the airbag 14 to deploy the airbag to the inflated condition. The inflator 32 may be of any known type, such as stored gas, solid propellant, augmented, or hybrid. The apparatus 10 includes a sensor, illustrated schematically at 50, for sensing an event for which inflation of the airbag 14 is desired, such as a collision. The inflator 32 is operatively connected to the sensor 50 via lead wires 52.

The airbag 14 can be constructed of any suitable material, such as nylon (e.g., woven nylon 6-6 yarns), and may be constructed in any suitable manner. For example, the airbag 14 may include one or more pieces or panels of material. If more than one piece or panel is used, the pieces or panels may be interconnected by known means, such as stitching, ultrasonic welding, heat bonding, or adhesives, to form the airbag. The airbag 14 may be uncoated, coated with a material, such as a gas impermeable urethane, or laminated with a material, such as a gas impermeable film. The airbag 14 thus may have a gas-tight or substantially gas-tight construction. Those skilled in the art will appreciate that alternative materials, such as polyester yarn, and alternatives coatings, such as silicone, may also be used to construct the airbag 14.

The airbag 14 may also include a vent (not shown) for releasing inflation fluid from the inflatable volume 54 of the airbag 14. The vent may be selectively actuated in order to help control or tailor inflation of the airbag in response to vehicle conditions, occupant conditions, or both. The vent may be actuatable actively, for example, in response to conditions determined via active sensors, or passively, for example, having a configuration responsive to physical conditions at the time of inflation. Alternatively, the vent may be a passive vent that always vents inflation fluid.

Upon sensing the occurrence of an event for which inflation of the airbag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the airbag 14 in a known manner. The inflating airbag 14 exerts a force on the cover, which moves the cover to the opened condition. The airbag 14 inflates from the stored condition to a deployed condition, such as the fully inflated and deployed condition illustrated in solid lines in FIG. 1. The airbag 14, while inflated, helps protect the vehicle occupant 20 from impacts with parts of the vehicle 12, such as the steering wheel 38 and instrument panel 36.

Figure 2:
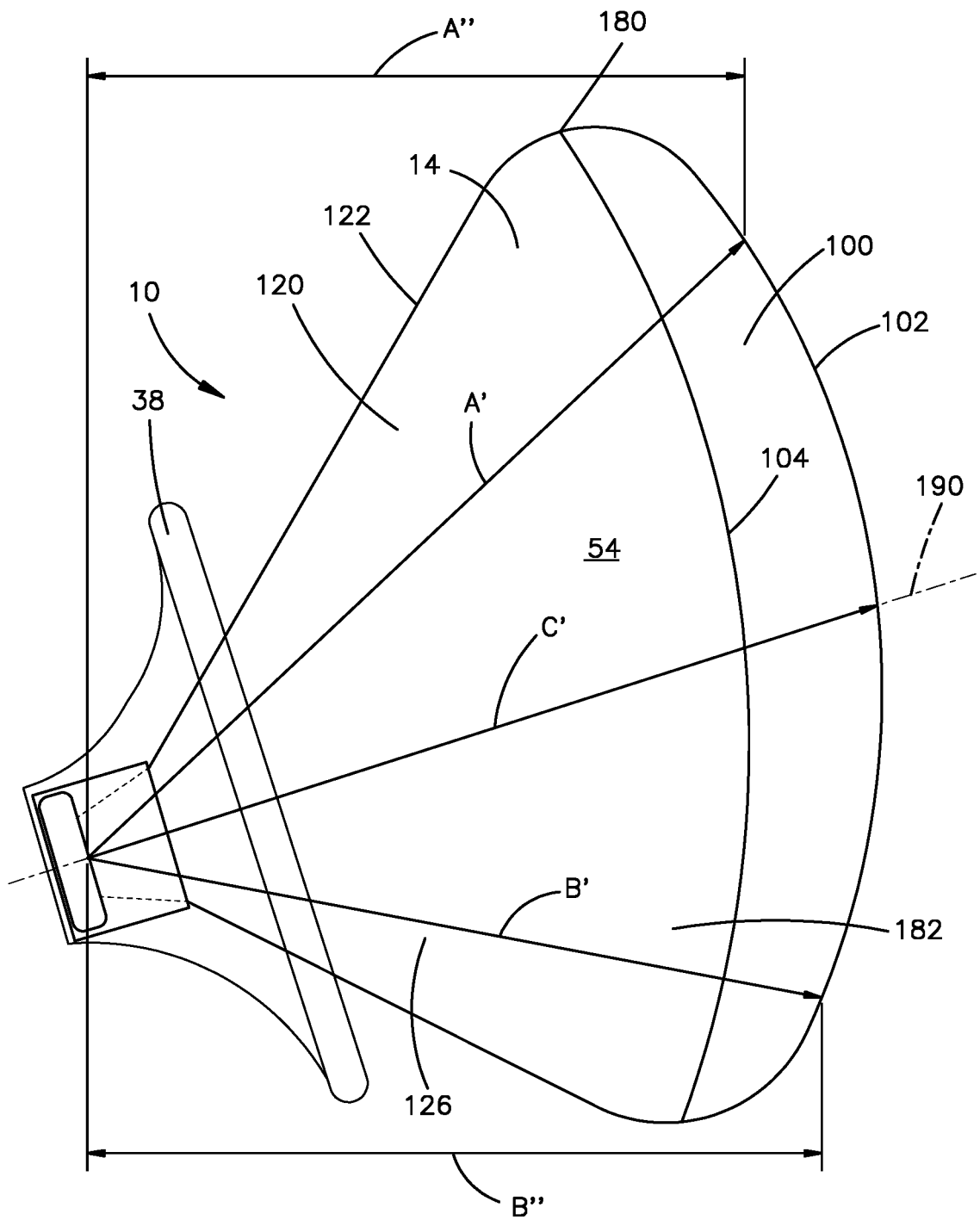
FIG. 2 is a side view of a portion of the apparatus of FIG. 1.

FIG. 2 illustrates the airbag 14 of FIG. 1 in greater detail. Referring to FIG. 2, the airbag 14 includes a front portion 100 that is presented facing the occupant 20 and a rear portion 120 that extends from the steering wheel 38. The front portion 100 forms the portion of the airbag 14 for receiving receives the occupant 20 upon the occurrence of an event for which inflation and deployment of the airbag results. The rear portion 120 is the portion of the airbag 14 that connects the airbag to the airbag module 30, to the inflator 32, to the steering wheel 38, or to any combination of these structures.

The airbag 14 illustrated in FIGS. 1 and 2 is illustrated as having a two-panel construction including a front panel 102 and a rear panel 122. The front panel 102 and rear panel 122 are secured to each other by an interconnection 104. In this description, the interconnection 104 is referred to as stitching. Those skilled in the art, however, will appreciate that the interconnection 104 may be formed from any suitable means, such as stitching, an ultrasonic weld, a heat bond, or an adhesive. In the inflated condition of the airbag 14, the front panel 102 is presented facing the occupant 20 and the rear panel 122 is presented facing primarily the steering wheel 38, instrument panel 36, and a windshield 60 of the vehicle 12. The front panel 102 therefore forms the occupant facing portions of the airbag 14, and the rear panel 122 forms the steering wheel/instrument panel/windshield facing portions of the airbag 14.

The two-panel construction of the airbag 14 of the embodiment illustrated in FIGS. 1 and 2 is exemplary in nature. Those skilled in the art will appreciate that the airbag 14 may have a configuration in which the number of panels used to construct the airbag is greater than two without departing from the spirit and scope of the invention. For example, the front panel 102, the rear panel 122, or both the front and rear panels could be constructed out of multiple panels that are constructed separately and interconnected by known means, such as stitching or ultrasonic welding, to complete the panel(s).

Additionally, those skilled in the art will appreciate that the size and extent of the airbag 14 may also vary. Factors that may influence varied sizes and or extents of the airbag 14 include, for example, the architecture of the vehicle 12, the location in the vehicle (e.g., driver side, passenger side, front seat, rear seat) where the airbag is located, the type of protection afforded by the airbag (e.g., frontal impact, side impact, rollover) and the desired area of occupant coverage. Such variations in the size and extent of the airbag 14 are considered to be within the scope of the invention.

The front panel 102 according to an example embodiment of the invention is illustrated in FIG. 3. In the embodiment illustrated in FIG. 3, the front panel 102 has a generally round overall shape and has a peripheral edge portion 104 that extends circumferentially around the perimeter of the panel. The circumference of the front panel 102 is indicated generally at X in FIG. 3. The round shape of the front panel 102 gives the front portion 100 a generally rounded shape when the airbag 14 is in the inflated and deployed position illustrated in FIGS. 1 and 2.

Those skilled in the art will therefore appreciate that the shape of the front panel 102 can be adjusted to produce a corresponding adjustment to the shape of the front portion 100 of the airbag 14. For example, to provide a wider area of coverage in the vehicle, the size of the front panel 100 may be increased in the Y dimension, which corresponds to the width of the vehicle. As another example, to provide a taller area of coverage, the size of the front panel 100 may be increased in the Z dimension, which corresponds to the height of the vehicle. In either scenario, the overall shape of the front panel 100 resulting from the configuration adjustments may be shifted to a more oblong, e.g., a more elliptical or ovular, shape.

When the airbag 14 inflates, the front panel 102 expands and is tensioned by the pressurized inflation fluid in the inflatable volume 54, which causes the front portion to assume a generally domed configuration illustrated in FIGS. 1 and 2. The front portion 100, when in the inflated and deployed position, faces convexly toward the occupant 20. The configuration of the front panel 102 may be configured to produce a shape of the front portion 100 that provides a desired degree of coverage between the vehicle structure, such as the steering wheel 38 and instrument panel 36, and the occupant 20.

According to the invention, the rear panel 122 is configured to give the rear portion 120 a generally con-shaped or conical configuration. The conical configuration of the rear portion 120 can be tailored through the configuration of the rear panel to position the front portion 100 at a desired position and orientation relative to the occupant 20 when the airbag 14 is in the inflated and deployed position of FIGS. 1 and 2. The rear panel 122 is illustrated in FIG. 4.

In this description, the term "conical" is meant to include complete cones, i.e., configurations where the cone-shaped structure includes a base, an apex, and a height extending from the base to the apex. The term "conical" as used herein is also meant to include frusto-conical configurations and structures. "Frusto-conical," as used herein, refers to a section of a cone where a plane or other contiguous surface transects the cone, thereby removing the portion of the cone above the transecting plane/surface and thereby eliminating or precluding inclusion of the apex and the portion extending between the apex and the transecting plane/surface. The conical configurations may include right conical or oblique conical configurations, and may include conical configurations having a base having a shape that is generally round, circular, elliptical, ovular (oval-shaped), or even irregularly shaped.

Referring to FIG. 4, the rear panel 122 has a generally round circular, ovular, or elliptical configuration, with a generally triangular, wedge-shaped portion being removed to produce the illustrated shape. The rear panel 122 thus has a main portion 124 that, when assembled, forms the conical wall 126 of the rear portion 120 of the airbag 14. The main portion 124 has a first or top dimension illustrated generally at A in FIG. 4, and a second or bottom dimension illustrated generally at B in FIG. 4. The rear panel 122 has a peripheral edge portion 130 that extends between the radial ends of the first and second terminal edge portions 132 and 134, respectively. The edge portions 132 and 134 extend relative to each other at an angle illustrated generally at C in FIG. 4. The edge portions 132 and 134 define a cutout portion 136 in the form of an angular wedge that is removed from the rear panel 122. The peripheral edge portion 130 has a length, illustrated generally at D in FIG. 4.

The rear panel 122 includes three inflator receiving portions 140. In the illustrated embodiment, each inflator receiving portion 140 includes a central inflator opening 142 and four fastener receiving apertures 144. Those skilled in the art will appreciate that the configuration of the inflator receiving portions 140 can vary without affecting or otherwise departing from the spirit of the invention. The inflator receiving portions 140 are partially defined by first and second slits 146 and 148, respectively, that extend tangentially from respective ones of the three inflator receiving portions.

A first one of the inflator receiving portions 140 is located at an end of the first edge portion 132 of the rear panel 122. A second one of the inflator receiving portions 140 is located at an end of the second edge portion 134 of the rear panel 122. A third one of the inflator receiving portions 140 is located between the first and second inflator receiving portions. The first slit 146 is located between the first and third inflator receiving portions 140. The second slit 148 is located between the second and third inflator receiving portions 140.

The rear panel 122 may also include indicia or other features that assist in the assembly and construction of the rear portion 120 of the airbag 14. For example, the rear panel 122 may include justification marks 150 in the form, for example, of notches or other indicia formed in or along the edge of the panel along the first and second edge portions 132 and 134. The rear panel 122 may also include sew lines 152 that extend along the edge portions 132 and 134, and sew lines 154 that circumscribe the inflator receiving portions 140.

For purposes of describing the construction of the airbag 14, the rear panel can be considered to have a center portion 160, a first end portion 162, and a second end portion 164. The first end portion 162 is defined by the first edge portion 132 and a dashed line, illustrated at 166, that is coextensive with the first slit 146 and extends radially to the peripheral edge 130 of the rear panel 122. The second end portion 164 is defined by the second edge portion 134 and a dashed line, illustrated at 168, that is coextensive with the second slit 148 and extends radially to the peripheral edge 130 of the rear panel 122. The center portion 160 is the portion of the rear panel 122 positioned between the end portions 162 and 164, i.e., the portion that extends between the lines 166 and 168.

To construct the rear portion 120 of the airbag 14, the first and second end portions 162 and 164 are maneuvered toward each other while at the same time the rear panel 122 is manipulated in the shape of a cone. This is illustrated in FIGS. 5A-5D. Referring to FIGS. 5A and 5B, the first and second edge portions 132 and 134 are moved towards each other as indicated by the arrows in FIG. 5A. While this occurs, the slits 146 and 148 permit the inflator receiving portions 140 associated with the respective end portions 162 and 164 to move relative to the central portion 160. The inflator receiving portions 140 of the first and second end portions 162 and 164 move beneath the inflator receiving portion end portions. As best illustrated in FIG. 5B, at this point, the rear panel 122 begins to assume a conical (particularly, a frusto-conical) configuration.

Referring to FIG. 5C, the first and second edge portions 132 and 134 are moved further towards each other as indicated by the arrows in FIG. 5C. While this occurs, the slits 146 and 148 permit the inflator receiving portions 140 associated with the respective end portions 162 and 164 to move further relative to the central portion 160 until all three inflator receiving structures are positioned with their respective inflator openings 142 in alignment with each other. At the same time, the justification notches 150 on the first and second edge portions 132 and 134 are brought into alignment with each other, thereby positioning the edge portions overlying and in alignment with each other.

Interconnections (e.g., stitching) are then applied to the rear panel 122 along the sew lines 152 to interconnect overlying portions of the first and second end portions 132 and 134. Interconnections are also applied along the sew lines 154 to interconnect the overlying inflator receiving portions 140. Additionally, interconnections may also be applied along the slits 146 and 148 to interconnect overlying portions of the rear panel 122 on opposite sides of the slits. Once the interconnections are applied, construction of the rear portion 120 of the airbag 14 is complete. The conical configuration of the completed rear portion 120 has a conical configuration that is best illustrated in FIGS. 5B, 5C, and 6.

Once the construction of the rear portion 120 is completed, the rear portion is interconnected with the front portion 100 to construct the airbag 14. According to the invention, the length D (see FIG. 4) of the periphery 130 of the rear panel 122 is equal to or approximately equal to the circumference X (see FIG. 3). Thus, when the rear portion 120 is constructed as described above, the base 170 of the conical rear portion has a circumference D (see FIG. 5C) that is equal to or approximately equal to the circumference X of the front panel 102. The front and rear portions 100 and 120 can thus be positioned overlying each other and interconnections (e.g., stitching) can be applied to produce the completed airbag 14.

According to the invention, the two-panel conical construction of the airbag 14 provides several advantageous features. First, construction of the airbag 14 requires only two panels and is thus simple in comparison to more complex multi-panel constructions. Additionally, the coverage, shape, and extent of the conical airbag 14 can be tailored by adjusting the shape of the first panel 102, the second panel 122, or both the first and second panels. Finally, the inflated depth dimensions of the conical airbag 14 can be configured without the use of additional structures, such as tethers, for interconnecting the front and rear panels 102 and 122.

According to the invention, the configuration of the airbag 14 can be controlled through the configuration of the front and rear panels 102 and 122. More particularly, the shape, extent, coverage, and depth/reach of the airbag 14 can be configured through the configuration of the front and rear panels 102 and 122. The configuration of the front panel 102 affects primarily the shape, extent, and coverage of the airbag 14. This is done through the overall shape of the front panel, as the airbag 14, as viewed from the perspective of the passenger 20, will have a shape that closely resembles the shape of the front panel 102 (see, e.g., FIG. 3).

Thus, if it is desired to adjust the shape, extent, or coverage of the airbag 14 to extend further laterally in the vehicle 12, the width of the front panel 102 can be adjusted in lateral directions as viewed in FIG. 3 to achieve the desired configuration. Similarly, if it is desired to adjust the shape, extent, or coverage of the airbag 14 to extend further vertically in the vehicle 12, the height of the front panel 102 can be adjusted in vertical directions as viewed in FIG. 3 to achieve the desired configuration. Those skilled in the art will thus appreciate that the front panel 102 in these scenarios would adopt a more elliptical or ovular configuration than the generally round configuration illustrated in FIG. 3.

The configuration of the rear panel 122 can affect the shape, extent, and coverage of the airbag 14 and also can affect the inflated depth and reach of the airbag. The dimensions of the rear panel 122 illustrated in FIG. 4: dimensions A (top), B (bottom), and C (angle), help determine Inflated depth and reach characteristics of the inflated airbag 14, illustrated generally at A', B', and C' in FIG. 2. Dimension A is associated with the length of the portion of the rear panel 122 that extends along a line that bisects angle C. Dimension B is associated with the lengths of the first and second edge portions 132 and 134. Dimension C is associated with the angle between the first and second edge portions 132 and 134.

Airbag characteristic A' relates to the inflated reach and characteristic A" relates to the inflated depth of an upper portion 180 of the airbag 14. The upper portion 180 of the airbag 14 is that portion that is configured to receive the upper torso and head of a normally sized occupant 20 in a normally seated position in the vehicle, as illustrated in FIG. 2. Increasing dimension A results in the shape of the rear panel 122 lengthening in the vertical direction as viewed in FIG. 2 and, as a result, causes the rear panel to become more elliptical, oblong, or ovular in that same direction. Increasing dimension A of the rear panel 122 helps increase the reach A' of the upper portion 180 and the depth A" of the upper portion. Conversely, decreasing dimension A of the rear panel 122 helps decrease the reach A' of the upper portion 180 and the depth A" of the upper portion.

Airbag characteristic B' relates to the inflated reach and characteristic B" relates to the inflated depth of a lower portion 182 of the airbag 14. The lower portion 182 of the airbag 14 is that portion that is configured to receive the lower torso and abdomen of a normally sized occupant 20 in a normally seated position in the vehicle, as illustrated in FIG. 2. Increasing dimension B results in the shape of the rear panel 122 lengthening in the horizontal direction as viewed in FIG. 2 and, as a result, causes the rear panel to become more elliptical, oblong, or ovular in that same direction. Increasing dimension B of the rear panel 122 helps increase the reach B' of the lower portion 182 and the depth B" of the lower portion. Conversely, decreasing dimension B of the rear panel 122 helps decrease the reach B' of the lower portion 182 and the depth B" of the lower portion.

Airbag characteristic C' relates to the overall inflated depth of the airbag 14 at or about its central axis 190. An increase in the overall depth of the airbag 14 will cause a resulting increase in the inflated depth of both the upper and lower portions 180 and 182 of the airbag. Correspondingly, a decrease in the overall depth of the airbag 14 will cause a resulting decrease in the inflated depth of both the upper and lower portions 180 and 182 of the airbag.

According to the invention, the conical configuration of the rear portion 120 of the airbag permits the angle C between the first and second edge portions 132 and 134 to help determine the overall inflated depth of the airbag 14. To increase the overall inflated depth of the airbag 14, the angle C is increased. As a result, to place the rear portion 120 in the assembled condition in the manner illustrated in FIGS. 5A-5D requires a greater angular shift of the first and second end portions 162 and 164 of the airbag to place the edge portions 132, 134 and inflator receiving portions 140 in overlying alignment with each other. As a result of this increased angle and angular shift, the base dimension of the conical rear portion 120 is decreased, whereas the height dimension is increased. The increased height dimension contributes directly to an increased overall depth of the airbag 14.

To decrease the overall inflated depth of the airbag 14, the angle C is reduced. As a result, to place the rear portion 120 in the assembled condition in the manner illustrated in FIGS. 5A-5D requires a lesser angular shift of the first and second end portions 162 and 164 of the airbag to place the edge portions 132, 134 and inflator receiving portions 140 in overlying alignment with each other. As a result of this reduced angle and angular shift, the base dimension of the conical rear portion 120 is increased, whereas the height dimension is decreased. The decreased height dimension contributes directly to an decreased overall depth of the airbag 14.

Those skilled in the art will thus appreciate that the two-piece construction of the airbag 14 of the invention advantageously permits for the ability to adjust the configuration of the airbag through the configurations of the front panel 102, rear panel 122, or both the front and rear panels. As long as the length D of the peripheral edge 130 of the rear panel 122 and the circumference X of the front panel 102 are maintained equal or substantially equal to each other, the front and rear panels will mate and produce the airbag 14 with relative ease through a simple interconnection 104. Following this rule, other characteristics can be adjusted with ease via simple adjustments to the dimensions of the rear panel 122.

For example, viewing FIG. 2, to move the front panel 102 toward or away the occupant 20 while maintaining the attitude of the panel would require only an increase or decrease, respectively, in the angle C. To adjust the attitude of the airbag 14, e.g., to move the upper portion 180 toward the occupant 20 and the lower portion 182 away from the occupant would require an increase in dimension A, a decrease in dimension B, or a combination of both. Conversely, to adjust the attitude of the airbag 14, e.g., to move the upper portion 180 away from the occupant 20 and the lower portion 182 toward the occupant would require an increase in dimension B, a decrease in dimension A, or a combination of both.

A second embodiment of the invention is illustrated in FIGS. 7 and 8. The embodiment illustrated in FIGS. 7 and 8 is similar to the embodiment illustrated in FIGS. 1-6. Therefore, reference numbers similar to those used in FIGS. 1-6 will be used to identify corresponding features in FIGS.

7 and 8, with the suffix "a" being added to the reference numbers used in FIGS. 7 and 8 to avoid confusion.

Referring to FIG. 8, the rear panel 122a has a generally rounded, lobed configuration. The rear panel 122a includes an upper central portion 200 having a semi-circular, arcuate periphery. First and second lower lateral portions 202 and 204, respectively, are located on opposite sides of the central portion 200. The lateral portions 202 and 204 have semi-circular, arcuate peripheries that extend laterally from the central portion 200, and thus contribute to the generally rounded, lobed configuration of the rear panel 122a. The rear panel 122a has a generally triangular, wedge-shaped portion removed to produce the illustrated shape.

The rear panel 122a has a main portion 124a formed by the central portion 200 and the lateral portions 202 and 204. The main portion 124a, when assembled, forms the conical wall 126a of the rear portion 120a of the airbag 14. The main portion 124a has a first or top dimension illustrated generally at A in FIG. 8, and a second or bottom dimension illustrated generally at B in FIG. 8. The rear panel 122a has a peripheral edge portion 130a that extends between the radial ends of the first and second terminal edge portions 132a and 134a, respectively. The edge portions 132a and 134a extend relative to each other at an angle illustrated generally at C in FIG. 8. The edge portions 132a and 134a define a cutout portion 136a in the form of an angular wedge that is removed from the rear panel 122a. The peripheral edge portion 130a has a length, illustrated generally at D in FIG. 8.

The rear panel 122a includes three inflator receiving portions 140a. In the illustrated embodiment, each inflator receiving portion 140a includes a central inflator opening 142a and four fastener receiving apertures 144a. Those skilled in the art will appreciate that the configuration of the inflator receiving portions 140a can vary without affecting or otherwise departing from the spirit of the invention. The inflator receiving portions 140a are partially defined by first and second slits 146a and 148a, respectively, that extend tangentially from respective ones of the three inflator receiving portions.

A first one of the inflator receiving portions 140a is located at an end of the first edge portion 132a of the rear panel 122a. A second one of the inflator receiving portions 140a is located at an end of the second edge portion 134a of the rear panel 122a. A third one of the inflator receiving portions 140a is located between the first and second inflator receiving portions. The first slit 146a is located between the first and third inflator receiving portions 140a. The second slit 148a is located between the second and third inflator receiving portions 140a.

The rear panel 122a may also include indicia or other features that assist in the assembly and construction of the rear portion 120 of the airbag 14. For example, the rear panel 122a may include justification marks 150a in the form, for example, of notches or other indicia formed in or along the edge of the panel along the first and second edge portions 132a and 134a. The rear panel 122a may also include sew lines 152a that extend along the edge portions 132a and 134a, and sew lines 154a that circumscribe the inflator receiving portions 140a.

For purposes of describing the construction of the airbag 14, the rear panel can be considered to have a center portion 160a, a first end portion 162a, and a second end portion 164a. The first end portion 162a corresponds generally to the first lateral portion 202 and is defined by the first edge portion 132a and a dashed line, illustrated at 166a, that is coextensive with the first slit 146a and extends radially to the peripheral edge 130a of the rear panel 122. The second end portion 164a corresponds generally to the second lateral portion 204 and is defined by the second edge portion 134a and a dashed line, illustrated at 168a, that is coextensive with the second slit 148a and extends radially to the peripheral edge 130a of the rear panel 122. The center portion 160a corresponds with the upper central portion 200 and is the portion of the rear panel 122 positioned between the end portions 162a and 164a, i.e., the portion that extends between the lines 166a and 168a.

Figure 9:
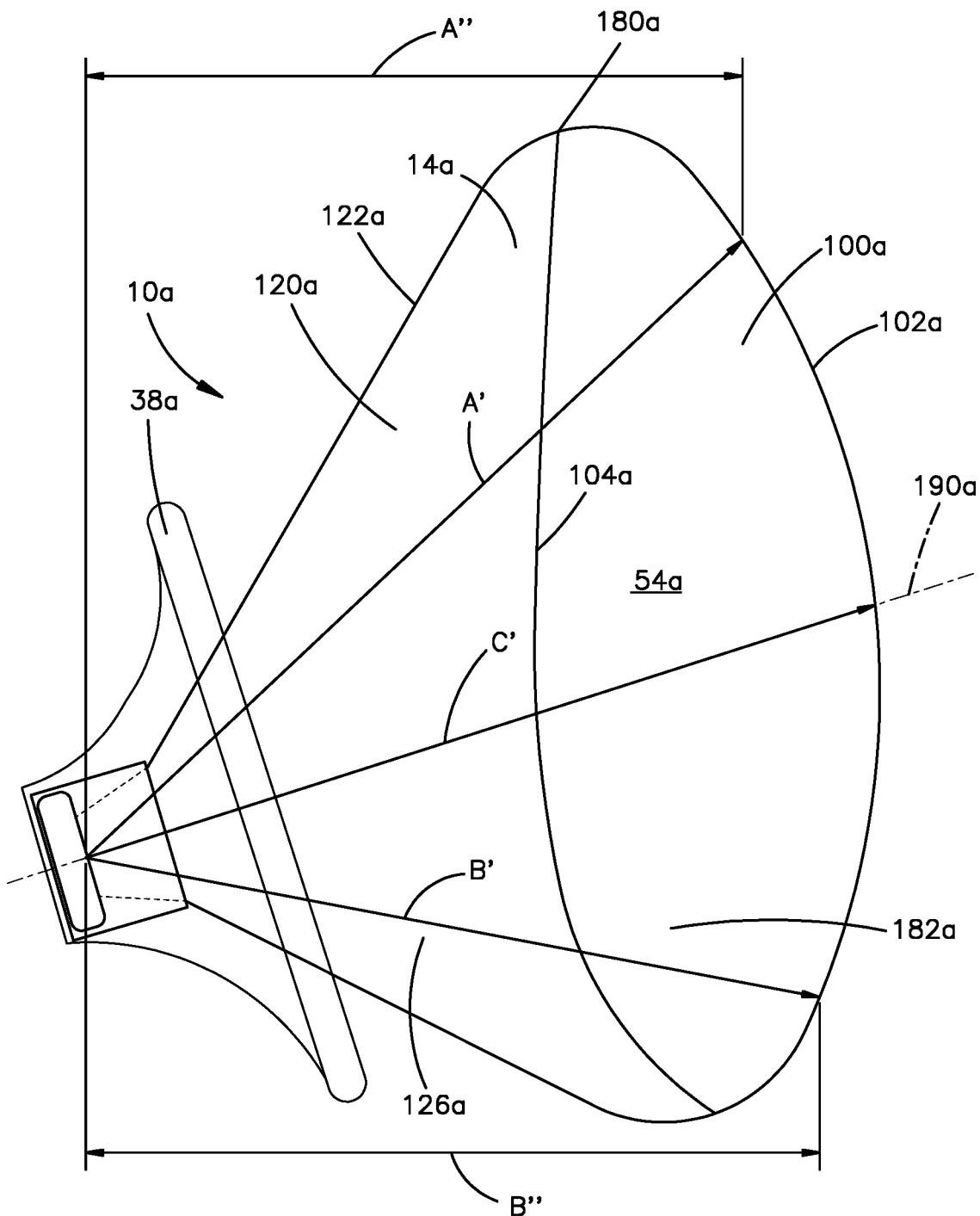
FIG. 9 is a side view of the apparatus of FIGS. 7 and 8 in an assembled and installed condition

Referring to FIGS. 7-9, to construct the rear portion 120a of the airbag 14a, the first and second end portions 162a and 164a are maneuvered toward each other while at the same time the rear panel 122a is manipulated in the shape of a cone in the same manner as that performed with the embodiment of FIGS. 1-6 (see especially FIGS. 5A-5D). In constructing the rear portion 120a, the first and second edge portions 132a and 134a are moved towards each other. While this occurs, the slits 146a and 148a permit the inflator receiving portions 140a associated with the respective end portions 162a and 164a to move relative to the central portion 160a. The inflator receiving portions 140a of the first and second end portions 162a and 164a move beneath the inflator receiving portion end portions. At this point, the rear panel 122a begins to assume a conical (particularly, a frusto-conical) configuration.

As the first and second edge portions 132a and 134a are moved further towards each other, the slits 146a and 148a permit the inflator receiving portions 140a associated with the respective end portions 162a and 164a to move further relative to the central portion 160a until all three inflator receiving structures are positioned with their respective inflator openings 142a in alignment with each other. At the same time, the justification notches 150a on the first and second edge portions 132a and 134a are brought into alignment with each other, thereby positioning the edge portions overlying and in alignment with each other.

Interconnections (e.g., stitching) are then applied to the rear panel 122a along the sew lines 152a to interconnect overlying portions of the first and second end portions 132a and 134a. Interconnections are also applied along the sew lines 154a to interconnect the overlying inflator receiving portions 140a. Additionally, interconnections may also be applied along the slits 146a and 148a to interconnect overlying portions of the rear panel 122 on opposite sides of the slits. Once the interconnections are applied, construction of the rear portion 120a of the airbag 14a is complete.

Once the construction of the rear portion 120a is completed, the rear portion is interconnected with the front portion 100a to construct the airbag 14a. According to the invention, the length D (see FIG. 8) of the periphery 130a of the rear panel 122a is equal to or approximately equal to the circumference X (see FIG. 7) of the front panel 102a. Thus, when the rear portion 120a is constructed as described above, the base of the conical/frustoconical rear portion has a circumference that is equal to or approximately equal to the circumference X of the front panel 102a. The front and rear portions 100a and 120a can thus be positioned overlying each other and interconnections (e.g., stitching) can be applied to produce the completed airbag 14a.

The airbag 14a of the embodiment of FIGS. 7-9 provides several advantageous features that are similar or identical to those provided by the airbag construction illustrated and described with regard to the embodiment of FIGS. 1-6. The construction of the airbag 14a requires only two panels, and the coverage, shape, and extent of the conical airbag can be tailored by adjusting the shape of one or both of the first and second panels 102a and 122a. The shape, extent, coverage, and depth/reach of the airbag 14a can be configured through the configuration of the front and rear panels 102a and 122a.

The airbag 14a, as viewed from the perspective of the passenger, will have a shape that closely resembles the shape of the front panel 102a. Thus, if it is desired to adjust the shape, extent, or coverage of the airbag 14a to extend further laterally in the vehicle 12a, the width of the front panel 102a can be adjusted in lateral directions to achieve the desired configuration. Similarly, if it is desired to adjust the shape, extent, or coverage of the airbag 14a to extend further vertically in the vehicle 12a, the height of the front panel 102a can be adjusted in vertical directions to achieve the desired configuration.

The configuration of the rear panel 122a can affect the shape, extent, and coverage of the airbag 14a and also can affect the inflated depth and reach of the airbag. The dimensions of the rear panel 122a illustrated in FIG. 8: dimensions A (top), B (bottom), and C (angle), help determine Inflated depth and reach characteristics of the inflated airbag 14a, illustrated generally at A', B', and C' in FIG. 9. Dimension A is associated with the length of the portion of the rear panel 122a that extends along a line that bisects angle C. Dimension B is associated with the lengths of the first and second edge portions 132a and 134a. Dimension C is associated with the angle between the first and second edge portions 132a and 134a.

Airbag characteristic A' relates to the inflated reach and characteristic A" relates to the inflated depth of an upper portion 180a of the airbag 14a. The upper portion 180a of the airbag 14a is that portion that is configured to receive the upper torso and head of a normally sized occupant in a normally seated position in the vehicle (see, e.g., FIG. 2). Increasing dimension A results in the shape of the rear panel 122a lengthening in the vertical direction and, as a result, causes the rear panel to become more elliptical, oblong, or ovular in that same direction. Increasing dimension A of the rear panel 122a helps increase the reach A' of the upper portion 180a and the depth A" of the upper portion. Conversely, decreasing dimension A of the rear panel 122a helps decrease the reach A' of the upper portion 180a and the depth A" of the upper portion.

Airbag characteristic B' relates to the inflated reach and characteristic B" relates to the inflated depth of a lower portion 182a of the airbag 14a. The lower portion 182 of the airbag 14 is that portion that is configured to receive the lower torso and abdomen of a normally sized occupant in a normally seated position in the vehicle (see, e.g., FIG. 2). Increasing dimension B results in the shape of the rear panel 122a lengthening in the horizontal direction and, as a result, causes the rear panel to become more elliptical, oblong, or ovular in that same direction. Increasing dimension B of the rear panel 122a helps increase the reach B' of the lower portion 182a and the depth B" of the lower portion. Conversely, decreasing dimension B of the rear panel 122a helps decrease the reach B' of the lower portion 182a and the depth B" of the lower portion.

Airbag characteristic C' relates to the overall inflated depth of the airbag 14a at or about its central axis 190a. An increase in the overall depth of the airbag 14a will cause a resulting increase in the inflated depth of both the upper and lower portions 180a and 182a of the airbag. Correspondingly, a decrease in the overall depth of the airbag 14a will cause a resulting decrease in the inflated depth of both the upper and lower portions 180a and 182a of the airbag.

The conical configuration of the rear portion 120a of the airbag 14a permits the angle C between the first and second edge portions 132a and 134a to help determine the overall inflated depth of the airbag. To increase the overall inflated depth of the airbag 14a, the angle C is increased. As a result, to place the rear portion 120a in the assembled condition requires a greater angular shift of the first and second end portions 162a and 164a of the airbag to place the edge portions 132a, 134a and inflator receiving portions 140a in overlying alignment with each other. As a result of this increased angle and angular shift, the base dimension of the conical rear portion 120a is decreased, whereas the height dimension is increased. The increased height dimension contributes directly to an increased overall depth of the airbag 14a.

To decrease the overall inflated depth of the airbag 14a, the angle C is reduced. As a result, to place the rear portion 120a in the assembled condition requires a lesser angular shift of the first and second end portions 162a and 164a of the airbag to place the edge portions 132a, 134a and inflator receiving portions 140a in overlying alignment with each other. As a result of this reduced angle and angular shift, the base dimension of the conical rear portion 120a is increased, whereas the height dimension is decreased. The decreased height dimension contributes directly to an decreased overall depth of the airbag 14a.

Those skilled in the art will thus appreciate that the two-piece construction of the airbag 14a of the invention advantageously permits for the ability to adjust the configuration of the airbag through the configurations of the front panel 102a, rear panel 122a, or both the front and rear panels. As long as the length D of the peripheral edge 130a of the rear panel 122a and the circumference X of the front panel 102a are maintained equal or substantially equal to each other, the front and rear panels will mate and produce the airbag 14a with relative ease through a simple interconnection 104a. Following this rule, other characteristics can be adjusted with ease via simple adjustments to the dimensions of the rear panel 122a.

For example, viewing FIG. 9, to move the front panel 102a away from or toward the steering wheel 38a while maintaining the attitude of the panel would require only an increase or decrease, respectively, in the angle C. To adjust the attitude of the airbag 14a, e.g., to move the upper portion 180a toward the occupant and the lower portion 182a away from the occupant would require an increase in dimension A, a decrease in dimension B, or a combination of both. Conversely, to adjust the attitude of the airbag 14a, e.g., to move the upper portion 180a away from the occupant and the lower portion 182a toward the occupant would require an increase in dimension B, a decrease in dimension A, or a combination of both.

From the above, it will be appreciated that the airbags of the embodiments of FIGS. 1-9 provide a simple, two-piece construction that maintains the ability to tailor or adjust certain dimensional, positional, or attitudinal characteristics of the inflated and deployed bag. Additionally, as a feature of the embodiment of FIGS. 7-9, the three lobed design of the rear panel 122a facilitates folding and packaging the airbag 14a. More specifically, due to the three lobed design, the inflator receiving portion can be gathered via a lateral fold, which permits the rear panel 122a to lie flat against the front panel 102a without bunching. This facilitates folding the airbag 14a to the stored condition neatly and in a space-efficient manner.

Figure 10:
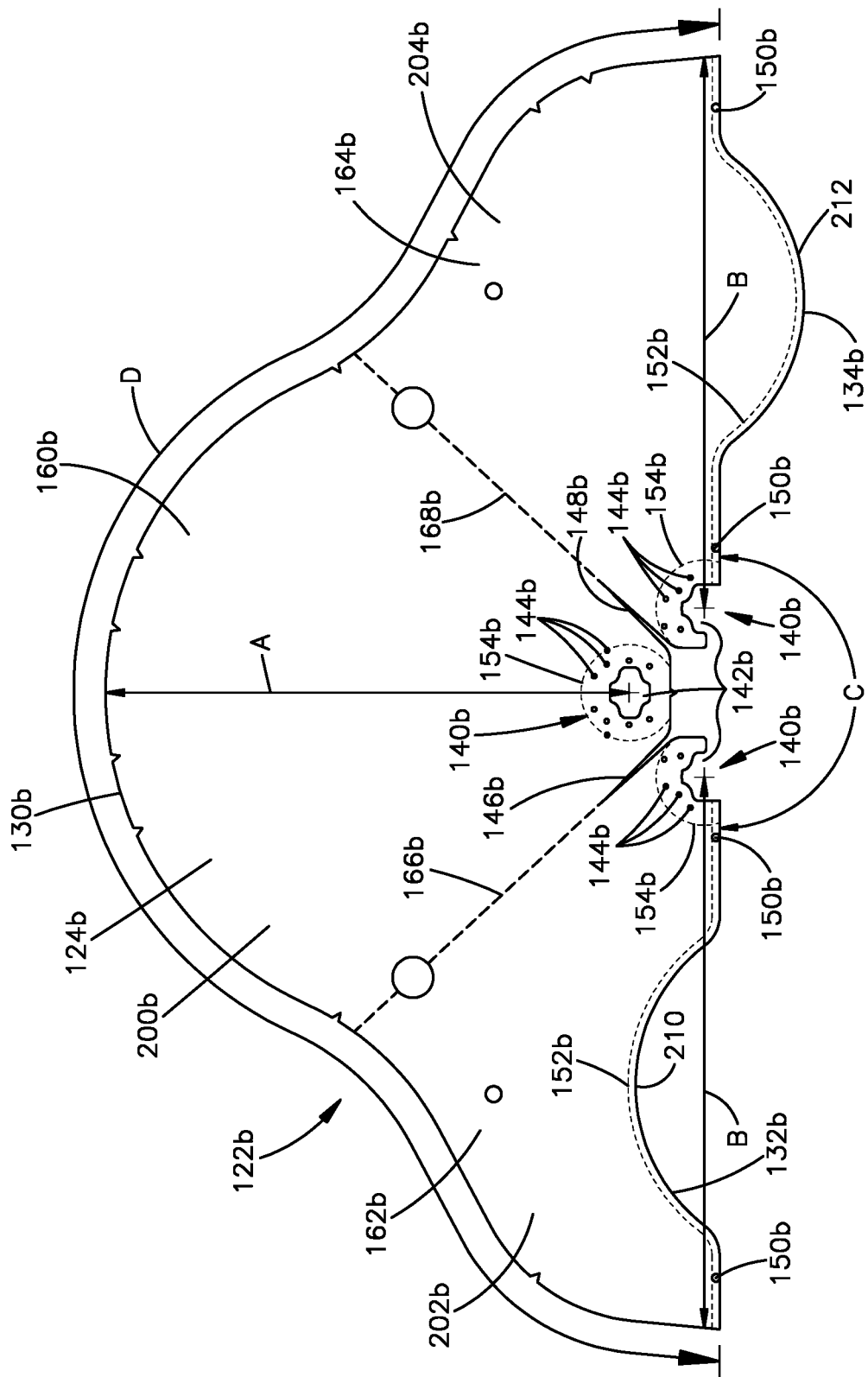
FIGS. 10 and 11 are plan views of portions of an apparatus for helping to protect an occupant of a vehicle, according to another embodiment of the invention.
Figure 11:
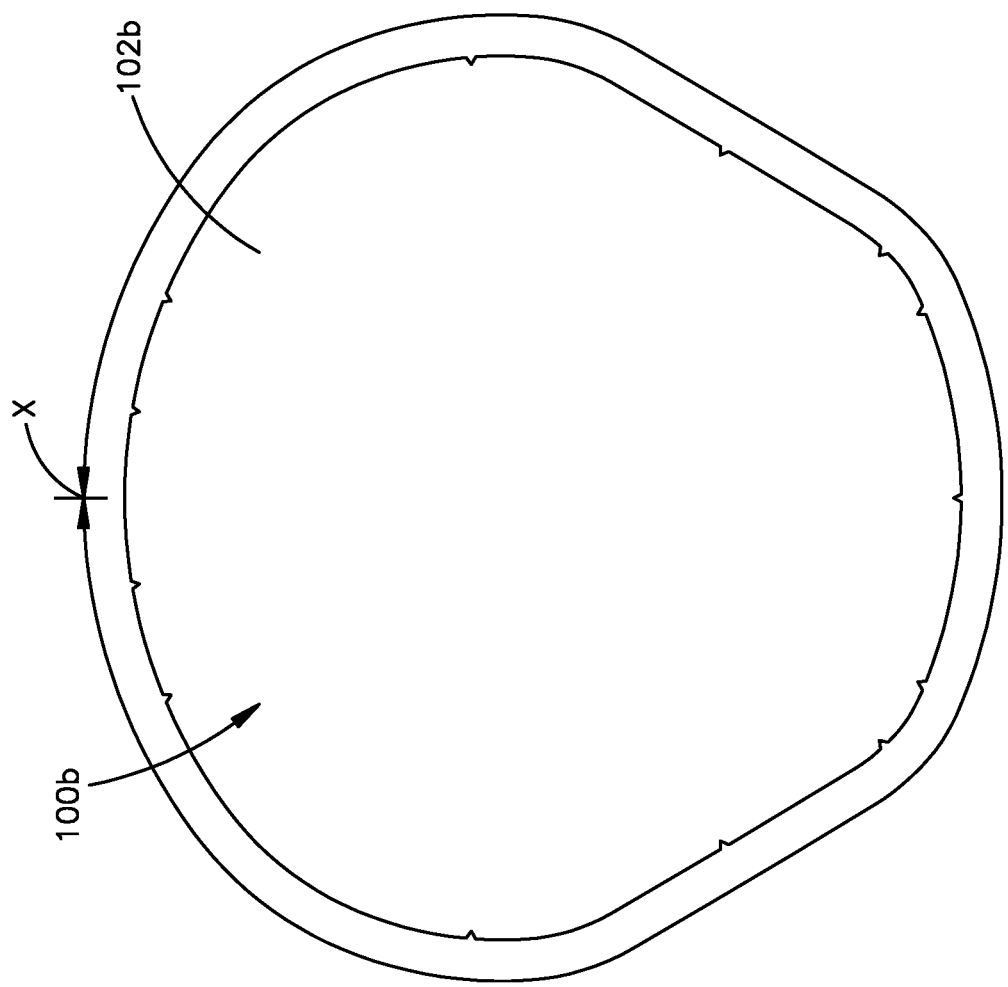

A third embodiment of the invention is illustrated in FIGS. 10-12. The embodiment illustrated in FIGS. 10-12 is similar to the embodiment illustrated in FIGS. 7 and 8. Therefore, reference numbers similar to those used in FIGS.

7 and 8 will be used to identify corresponding features in FIGS. 10-12, with the suffix "b" being added to the reference numbers used in FIGS. 7 and 8 to avoid confusion.

Referring to FIG. 10, the rear panel 122b has a generally rounded, lobed configuration. The rear panel 122b includes an upper central portion 200b having a semi-circular, arcuate periphery. First and second lower lateral portions 202b and 204, respectively, are located on opposite sides of the central portion 200. The lateral portions 202b and 204b have semi-circular, arcuate peripheries that extend laterally from the central portion 200, and thus contribute to the generally rounded, lobed configuration of the rear panel 122b. The rear panel 122b has a generally triangular, wedge-shaped portion removed to produce the illustrated shape.

The rear panel 122b has a main portion 124b formed by the central portion 200b and the lateral portions 202b and 204b. The main portion 124b, when assembled, forms the conical wall 126b of the rear portion 120b of the airbag 14b. The main portion 124b has a first or top dimension illustrated generally at A in FIG. 10, and a second or bottom dimension illustrated generally at B in FIG. 10. The rear panel 122b has a peripheral edge portion 130b that extends between the radial ends of the first and second terminal edge portions 132b and 134b, respectively. The edge portions 132b and 134b extend relative to each other at an angle illustrated generally at C in FIG. 10. In FIG. 10, the angle C is 180 degrees, so the edge portions 132b and 134b extend co-linearly. The first and second terminal edge portions 132b and 134b have respective curved portions 210 and 212. The peripheral edge portion 130b has a length, illustrated generally at D in FIG. 10.

The rear panel 122b includes three inflator receiving portions 140b. In the illustrated embodiment, each inflator receiving portion 140b includes an inflator opening 142b and fastener receiving apertures 144b. Those skilled in the art will appreciate that the configuration of the inflator receiving portions 140b can vary without affecting or otherwise departing from the spirit of the invention. The inflator receiving portions 140b are partially defined by first and second slits 146b and 148b, respectively, that extend tangentially from respective ones of the three inflator receiving portions.

A first one of the inflator receiving portions 140b is located at an end of the first edge portion 132b of the rear panel 122b. A second one of the inflator receiving portions 140b is located at an end of the second edge portion 134b of the rear panel 122b. A third one of the inflator receiving portions 140b is located between the first and second inflator receiving portions. The first slit 146b is located between the first and third inflator receiving portions 140b. The second slit 148b is located between the second and third inflator receiving portions 140b.

The rear panel 122b may also include indicia or other features that assist in the assembly and construction of the rear portion 120b of the airbag 14. For example, the rear panel 122b may include justification marks 150b in the form, for example, of notches or other indicia formed in or along the edge of the panel along the first and second edge portions 132b and 134b. The rear panel 122b may also include sew lines 152b that extend along the edge portions 132b and 134b, and sew lines 154b that circumscribe the inflator receiving portions 140b.

For purposes of describing the construction of the airbag 14, the rear panel can be considered to have a center portion 160b, a first end portion 162b, and a second end portion 164b. The first end portion 162b corresponds generally to the first lateral portion 202b and is defined by the first edge portion 132b and a dashed line, illustrated at 166b, that is coextensive with the first slit 146b and extends radially to the peripheral edge 130b of the rear panel 122. The second end portion 164b corresponds generally to the second lateral portion 204b and is defined by the second edge portion 134b and a dashed line, illustrated at 168b, that is coextensive with the second slit 148b and extends radially to the peripheral edge 130b of the rear panel 122. The center portion 160b corresponds with the upper central portion 200b and is the portion of the rear panel 122b positioned between the end portions 162b and 164b, i.e., the portion that extends between the lines 166b and 168b.

Referring to FIGS. 10-12, to construct the rear portion 120b of the airbag 14b, the first and second end portions 162b and 164b are maneuvered toward each other while at the same time the rear panel 122b is manipulated in the shape of a cone in the same manner as that performed with the embodiment of FIGS. 1-6 (see especially FIGS. 5A-5D). In constructing the rear portion 120b, the first and second edge portions 132b and 134b are moved towards each other. While this occurs, the slits 146b and 148b permit the inflator receiving portions 140b associated with the respective end portions 162b and 164b to move relative to the central portion 160b. The inflator receiving portions 140b of the first and second end portions 162b and 164b move beneath the inflator receiving portion end portions. At this point, the rear panel 122b begins to assume a conical (particularly, a frusto-conical) configuration.

As the first and second edge portions 132b and 134b are moved further towards each other, the slits 146b and 148b permit the inflator receiving portions 140b associated with the respective end portions 162b and 164b to move further relative to the central portion 160b until all three inflator receiving structures are positioned with their respective inflator openings 142b in alignment with each other. Also, as the first and second edge portions 132b and 134b are moved together, the convex curved portion 212 enters and mates with the concave curved portion 210. At the same time, the justification notches 150b on the first and second edge portions 132b and 134b are brought into alignment with each other. This positions the edge portions 132b and 134b, including their respective curved portions 210 and 212, in an overlying position in alignment with each other.

Interconnections (e.g., stitching) are then applied to the rear panel 122b along the sew lines 152b to interconnect overlying portions of the first and second end portions 132b and 134b, including the curved portions 210 and 212 to form a seam 214. Interconnections are also applied along the sew lines 100b to interconnect the overlying inflator receiving portions 140b. Additionally, interconnections may also be applied along the slits 146b and 148b to interconnect overlying portions of the rear panel 122b on opposite sides of the slits. Once the interconnections are applied, construction of the rear portion 120b of the airbag 14b is complete. The constructed rear portion 120b is illustrated in FIG. 12.

Once the construction of the rear portion 120b is completed, the rear portion is interconnected with the front portion 100b to construct the airbag 14b. According to the invention, the length D (see FIG. 10) of the periphery 130b of the rear panel 122b is equal to or approximately equal to the circumference X (see FIG. 11) of the front panel 102b. Thus, when the rear portion 120b is constructed as described above, the base of the conical/frustoconical rear portion has a circumference that is equal to or approximately equal to the circumference X of the front panel 102b. The front and rear portions 100b and 120b can thus be positioned overlying each other and interconnections (e.g., stitching) can be applied to produce the completed airbag 14b.

The airbag 14b of the embodiment of FIGS. 10-12 provides several advantageous features that are similar or identical to those provided by the airbag construction illustrated and described with regard to the embodiment of FIGS. 1-9. The construction of the airbag 14b requires only two panels, and the coverage, shape, and extent of the conical airbag can be tailored by adjusting the shape of one or both of the first and second panels 102b and 122b. The shape, extent, coverage, and depth/reach of the airbag 14b can be configured through the configuration of the front and rear panels 102b and 122b.

The airbag 14b, as viewed from the perspective of the passenger, will have a shape that closely resembles the shape of the front panel 102b. Thus, if it is desired to adjust the shape, extent, or coverage of the airbag 14b to extend further laterally in the vehicle 12b, the width of the front panel 102b can be adjusted in lateral directions to achieve the desired configuration. Similarly, if it is desired to adjust the shape, extent, or coverage of the airbag 14b to extend further vertically in the vehicle 12b, the height of the front panel 102b can be adjusted in vertical directions to achieve the desired configuration.

The configuration of the rear panel 122b can affect the shape, extent, and coverage of the airbag 14b and also can affect the inflated depth and reach of the airbag. The dimensions of the rear panel 122b illustrated in FIG. 10: dimensions A (top), B (bottom), and C (angle), help determine Inflated depth and reach characteristics of the inflated airbag 14b, illustrated generally at A', B', and C' in FIG. 9. Dimension A is associated with the length of the portion of the rear panel 122b that extends along a line that bisects angle C. Dimension B is associated with the lengths of the first and second edge portions 132b and 134b. Dimension C is associated with the angle between the first and second edge portions 132b and 134b.

Airbag characteristic A' relates to the inflated reach and characteristic A" relates to the inflated depth of an upper portion 180b of the airbag 14b. The upper portion 180b of the airbag 14b is that portion that is configured to receive the upper torso and head of a normally sized occupant in a normally seated position in the vehicle (see, e.g., FIG. 2). Increasing dimension A results in the shape of the rear panel 122b lengthening in the vertical direction and, as a result, causes the rear panel to become more elliptical, oblong, or ovular in that same direction. Increasing dimension A of the rear panel 122b helps increase the reach A' of the upper portion 180b and the depth A" of the upper portion. Conversely, decreasing dimension A of the rear panel 122b helps decrease the reach A' of the upper portion 180b and the depth A" of the upper portion.

Airbag characteristic B' relates to the inflated reach and characteristic B" relates to the inflated depth of a lower portion 182b of the airbag 14b. The lower portion 182b of the airbag 14b is that portion that is configured to receive the lower torso and abdomen of a normally sized occupant in a normally seated position in the vehicle (see, e.g., FIG. 2). Increasing dimension B results in the shape of the rear panel 122b lengthening in the horizontal direction and, as a result, causes the rear panel to become more elliptical, oblong, or ovular in that same direction. Increasing dimension B of the rear panel 122b helps increase the reach B' of the lower portion 182b and the depth B" of the lower portion. Conversely, decreasing dimension B of the rear panel 122b helps decrease the reach B' of the lower portion 182b and the depth B" of the lower portion.

Airbag characteristic C' relates to the overall inflated depth of the airbag 14b at or about its central axis 190b. An increase in the overall depth of the airbag 14b will cause a resulting increase in the inflated depth of both the upper and lower portions 180b and 182b of the airbag. Correspondingly, a decrease in the overall depth of the airbag 14b will cause a resulting decrease in the inflated depth of both the upper and lower portions 180b and 182b of the airbag.

The conical configuration of the rear portion 120b of the airbag 14b permits the angle C between the first and second edge portions 132b and 134b to help determine the overall inflated depth of the airbag. To increase the overall inflated depth of the airbag 14b, the angle C is increased. As a result, to place the rear portion 120b in the assembled condition requires a greater angular shift of the first and second end portions 162b and 164b of the airbag to place the edge portions 132b, 134b and inflator receiving portions 140b in overlying alignment with each other. As a result of this increased angle and angular shift, the base dimension of the conical rear portion 120b is decreased, whereas the height dimension is increased. The increased height dimension contributes directly to an increased overall depth of the airbag 14b.

To decrease the overall inflated depth of the airbag 14b, the angle C is reduced. As a result, to place the rear portion 120b in the assembled condition requires a lesser angular shift of the first and second end portions 162b and 164b of the airbag to place the edge portions 132b, 134b and inflator receiving portions 140b in overlying alignment with each other. As a result of this reduced angle and angular shift, the base dimension of the conical rear portion 120b is increased, whereas the height dimension is decreased. The decreased height dimension contributes directly to an decreased overall depth of the airbag 14b.

Those skilled in the art will thus appreciate that the two-piece construction of the airbag 14b of the invention advantageously permits for the ability to adjust the configuration of the airbag through the configurations of the front panel 102b, rear panel 122b, or both the front and rear panels. As long as the length D of the peripheral edge 130b of the rear panel 122b and the circumference X of the front panel 102b are maintained equal or substantially equal to each other, the front and rear panels will mate and produce the airbag 14b with relative ease through a simple interconnection 104b. Following this rule, other characteristics can be adjusted with ease via simple adjustments to the dimensions of the rear panel 122b.

For example, viewing FIG. 9, to move the front panel 102b away from or toward the steering wheel 38b while maintaining the attitude of the panel would require only an increase or decrease, respectively, in the angle C. To adjust the attitude of the airbag 14b, e.g., to move the upper portion 180b toward the occupant and the lower portion 182b away from the occupant would require an increase in dimension A, a decrease in dimension B, or a combination of both. Conversely, to adjust the attitude of the airbag 14b, e.g., to move the upper portion 180b away from the occupant and the lower portion 182b toward the occupant would require an increase in dimension B, a decrease in dimension A, or a combination of both.

From the above, it will be appreciated that the airbags of the embodiments of FIGS. 1-12 provide a simple, two-piece construction that maintains the ability to tailor or adjust certain dimensional, positional, or attitudinal characteristics of the inflated and deployed bag. Additionally, as a feature of the embodiment of FIGS. 7-12, the three lobed design of the rear panel 122b facilitates folding and packaging the airbag 14b. More specifically, due to the three lobed design, the inflator receiving portion can be gathered via a lateral fold, which permits the rear panel 122b to lie flat against the front panel 102b without bunching. This facilitates folding the airbag 14b to the stored condition neatly and in a space-efficient manner.

An additional advantage is achieved through the inclusion of the curved portions 210 and 212 of the edge portions 132b and 134b, respectively. Since, as described above, the three lobed design permits the inflator receiving portion to be gathered via a lateral fold and the rear panel 122b can lie flat against the front panel 102b without bunching, contact between the rear and front panel will occur during air bag deployment. As the air bag 14b deploys and unfurls, the front and rear panels 102b and 122b can slide against each other. Since the seam 214 formed by the stitching 152b along the edge portions 132b and 134b is configured to extend in a direction that is parallel to or in the direction of the deployment direction, i.e., away from the steering wheel 38b, portions of the front panel 102b that are positioned overlying the seam in the stored condition can move or slide along the length of the seam during deployment.

Because of this, it has been discovered that a rear panel in which the seam formed along the edge portions is straight, such as the seam formed along edge portions 132a, 134a of the rear panel 122a of FIG. 8, can result in the portion of the front panel (e.g., front panel 102a) that engages the seam in the stored position can rub against the length of the seam during deployment and, as a result, can be damaged. The result of the damage can be tears, perforations, or other openings in the front panel, with inflation fluid leakage resulting.

Advantageously, configuring the first and second edge portions 132b and 134b to include curved portions 210 and 212 causes the seam 214 to take on a curved, as opposed to straight, configuration. As a result, when the air bag 14b deploys, the portions of the front panel 102b that rub against the seam 214 change due to the curvature of the seam. Although the contact between the rear panel 122b and the front panel 102b is dynamic since they are both moving during deployment, their movement is in the direction of deployment, which is essentially linear, i.e., away from the steering wheel 38b. Thus, any rubbing or frictional engagement between the panels is linear. Because, however, the seam 214 is curved and deviates (e.g., laterally) from the generally linear direction of deployment, portions of the front panel 102b that would otherwise rub along the length of the linear seam now only rub momentarily along the seam as the curvature causes the engaging portion of the front panel to shift laterally with respect to the deployment direction. The frictional engagement between the panels thus shifts position laterally during deployment and thereby prevents excessive wear, which could cause the aforementioned perforations, leakage, rupture, etc.

From the above description of the invention, those skilled in the art will perceive improvements, changes and modifications. For example, the curved portions 210 and 212 are illustrated as being generally semi-circular or arcuate in nature so that the resulting seam 214 deviates from the deployment direction. The curved portions could, however, have alternative configurations, such as alternative (e.g., irregular) curves or linear (e.g., irregularly arranged) configurations that deviate from the deployment direction so as to help prevent damage from friction. Such improvements, changes and modifications within the skill of the art are intended to be covered by the appended claims.

Having described the invention, the following is claimed:

1. An inflatable vehicle occupant protection device comprising:
a front panel and a rear panel that are interconnected to at least partially define an inflatable volume of the protection device, the rear panel having a conical configuration resulting from interconnected portions of the rear panel that are interconnected with each other along a seam, the seam being configured to deviate laterally from a deployment direction of the protection device so that portions of the protection device that engage and move along the seam shift laterally during deployment to reduce damage due to friction with the seam.

2. The protection device recited in claim 1, wherein the rear panel has a cutout portion that defines first and second edge portions of the rear panel that extend radially from a central portion of the rear panel that is configured to receive an inflator, the interconnected portions of the rear panel comprising the first and second edge portions, wherein the first and second edge portions are curved so that the seam takes on a curved configuration.

3. The protection device recited in claim 2, wherein the curve of the first and second edges are mirror images of each other.

4. The protection device recited in claim 2, wherein the curve of the first edge is concave and the curve of the second edge is convex.

5. The protection device recited in claim 2, wherein the rear panel has a first dimension associated with a length of a portion of the rear panel extending along a line that bisects an angle between the first and second edge portions, the first dimension helping to determine the inflated reach and depth of an upper portion of the protection device.

6. The protection device recited in claim 5, wherein the rear panel has a second dimension associated with the length of the first and second edge portions, the second dimension helping to determine the inflated reach and depth of a lower portion of the protection device.

7. The protection device recited in claim 6, wherein the rear panel has a third dimension associated with the angle between the first and second edge portions, the third dimension helping to determine the inflated depth of both the upper portion and the lower portion of the protection device.

8. The protection device recited in claim 2, wherein the rear panel has a peripheral edge portion that extends from a radial end of the first edge portion to a radial end of the second edge portion, and the front panel has a peripheral edge portion that extends around an entire peripheral edge portion of the front panel, the peripheral edge portion of the rear panel having a length that is substantially equal to a length of the peripheral edge portion of the front panel.

9. The protection device recited in claim 2, wherein the rear panel comprises a first inflator receiving portion, a second inflator receiving portion, and a third inflator receiving portion positioned between the first and second inflator receiving portions, a first slit in the rear panel being located between the first and third inflator receiving portions, a second slit in the rear panel being located between second and third inflator receiving portions, the first and second slits permitting the first and second inflator receiving portions to move into overlying alignment with each other and with the third inflator receiving portion when the portions of the rear panel are interconnected.

10. The protection device recited in claim 2, wherein the rear panel comprises a first inflator receiving portion at an end of the first edge portion, a second inflator receiving portion at the end of the second edge portion, and a third inflator receiving portion positioned between the first and second inflator receiving portions, the first and second inflator receiving portions moving into overlying alignment with each other and with the third inflator receiving portion when the portions of the rear panel are interconnected.

11. The protection device recited in claim 10, further comprising a first slit in rear panel located between first and third inflator receiving portions, and a second slit in rear panel located between second and third inflator receiving portions, the first and second slits permitting the first and second inflator receiving portions to move into alignment with each other and with third inflator receiving portion when the portions of the rear panel are interconnected.

12. The protection device recited in claim 1, wherein the protection device comprises a driver frontal airbag, the rear panel connecting the protection device to a vehicle steering wheel.

13. The protection device recited in claim 1, wherein the front panel has a single piece fabric construction and the rear panel has a single piece fabric construction, the inflatable volume of the protection device being defined entirely by these two single pieces of fabric.

14. An airbag module comprising the protection device recited in claim 1, an inflator for providing inflation fluid for inflating the protection device, and a housing for storing the protection device in an deflated condition.

15. A vehicle safety system comprising the airbag module of claim 14.

16. A method for constructing an inflatable vehicle occupant protection device, comprising:
providing a panel of material for constructing the protection device;
forming a cutout portion in the panel, the cutout portion defining first and second edge portions that extend inward from a periphery of the panel toward each other in a converging manner;
folding or otherwise manipulating the panel to position the first and second edge portions overlapping each other; and
interconnecting the overlying first and second edge portions to define a seam of the airbag;
wherein the step of forming a cutout portion comprises configuring the cutout portion so that the first and second edge portions have curved configurations resulting in a curved configuration of the seam that deviates from a more efficient linear seam configuration.

* * * * *